Figures 1, 2, 3:
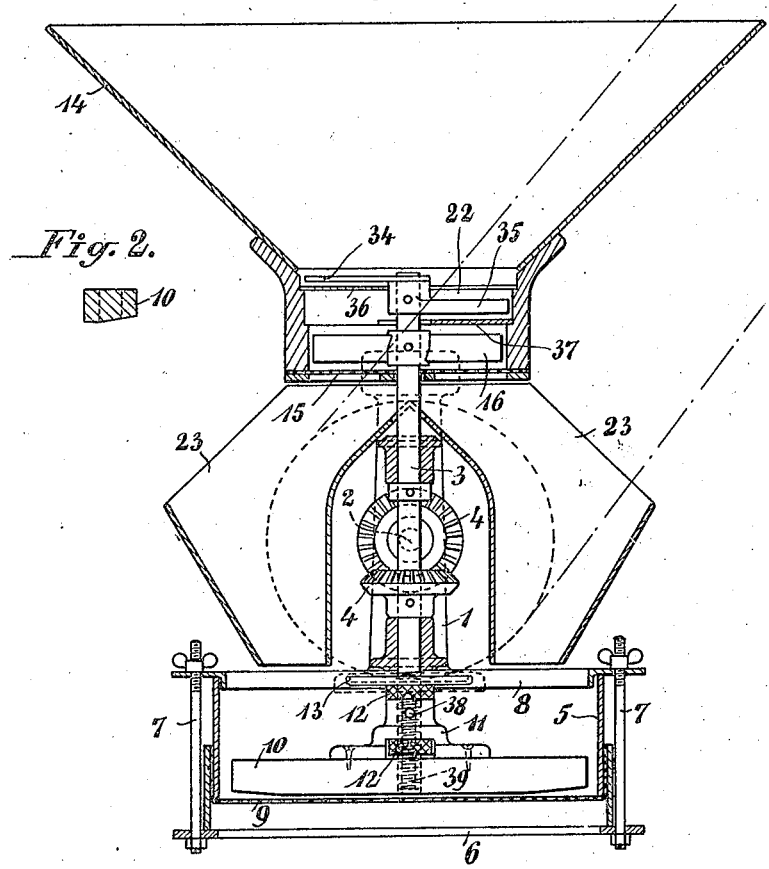

Sept. 25, 1923.

P. W. FUNCK

MACHINE FOR GRATING DOUGH

Filed April 12, 1921

1,469,142

Inventor
Paul Wilhelm Funck
By
Attorney

Patented Sept. 25, 1923.

1,469,142

UNITED STATES PATENT OFFICE.

PAUL WILHELM FUNCK, OF STUTTGART, GERMANY.

MACHINE FOR GRATING DOUGH.

Application filed April 12, 1921. Serial No. 460,801.

*To all whom it may concern:*

Be it known that I, PAUL WILHELM FUNCK, a citizen of Germany, residing in Stuttgart, Germany, have invented a certain new and useful Improved Machine for Grating Dough, of which the following is a specification.

The invention relates to a machine for breaking up dough into small pieces which when dried are sold for thickening soup. For this purpose the dough in a kneaded condition is rubbed against and forced through a sieve.

According to the invention, a product of uniform dimensions and pleasing appearance is produced by a machine of very simple operation, which also may be connected with other machines requiring a uniform conveyance of small pieces of dough.

The accompanying drawing shows an example of a machine according to the invention. Fig. 1 is a vertical section, Fig. 2 is a section through the main rubbing member, and Fig. 3 is a plan of the base of the hopper of the machine.

On the frame of the machine is a pedestal 1 in which are mounted a horizontal shaft 2, driven by a belt pulley, and a vertical shaft 3 which carries the working parts. The shaft 3 is rotated by the shaft 2 through a pair of bevel wheels 4. The sieve 5 has the form of an ordinary baker's sieve and rests, so as to be easily removed, on a supporting ring 6 and is held in position against an angle iron ring 8 fastened to the pedestal 1 by bolts 7 extending between said supporting ring 6 and angle iron 8. An arm 10, preferably of wood, rotates over the base 9 of the sieve and is fastened to a hub 11 from which a pin 38 projects into a groove 39 of the shaft 3, the lower end of which is screw-threaded, said hub being vertically adjustable by a pair of nuts 12 upon the shaft 3 which engage the upper and lower ends, respectively, of said hub. A cover 13 prevents the lubricant which may run out of the bearing of the pedestal 1 from dropping on to the sieve.

As shown in Fig. 2, the lower surface of the arm 10 is beveled toward one side and as said arm rotates only the beveled surface which presses the dough against the elastic sieve 9 exerts any rubbing action, while the other part which rotates behind the inclined edge loosens the particles that remain adhering to the sieve and drives them before it and so continually cleans the sieve.

A hopper 14 carried by the pedestal 1 has a delivery spout depending from its lower end to form a continuation thereof. A coarse-meshed sieve 15 extends across the lower end of the delivery spout and has a central opening through which the vertical shaft 3 extends. The delivery spout is internally shouldered at or near its upper end and also intermediate its upper and lower ends. A base plate 36 for the hopper is seated within the spout upon the upper shoulder and is cut away to straddle the vertical shaft 3 and to afford a passageway from the hopper to the spout. A second plate 37 is seated within the spout upon the intermediate shoulder to serve as a catch plate for the material delivered from the hopper through the passage afforded by the cut-away portion of the plate 36. A recess 22 is thus formed between the plates 36 and 37.

The plate 37 is cut away, as shown by dotted lines in Fig. 3, to straddle the vertical shaft 3 and to afford a passage for the material which falls upon the plate 37 through the cut-away portion of the plate 36. The plates 36 and 37 are arranged in the hopper with their cut-away portions in staggered relation.

A blade 34 carried by the vertical shaft 3, rotates above and close to the base plate 36 of the hopper and an arm 35 rotates in the recess 22 between the base plate 36 and the catch plate 37. Another arm 16 on the vertical shaft 3 rotates between the catch plate 37 and the sieve 15.

The pieces of dough placed in the hopper, and which may be of any size, are swept around by the blade 34 upon the base plate 36 and a shear-like action is exerted upon them between the blade 34 and one edge of the cut-away portion of the plate 36 as they pass through the opening afforded by said cut-away portion. Thus they are cut into smaller pieces. They then fall upon the catch plate 37, are swept around upon said plate by the arm 35, and pass through the cut-away portion of the plate 37 to the sieve 15. The arm 16 then sweeps them around on the sieve 15, and forces them through the said sieve into the funnel 23, from which they are delivered into the fine sieve 5. They are then forced through the sieve 5 by the arm 10.

It is of importance that the rubbing arms over the sieves should always drive and disintegrate the pieces of dough in a loose condition. Any congestion makes the work of the machine more difficult and causes the dough to be forced through the meshes of the sieves with a considerable pressure, whereby pieces of irregular length and unpleasing jagged appearance are formed. This drawback is obviated by the dough being disintegrated gradually into small pieces, and especially by the fact that the material can only pass from the hopper into the rubbing device in uniformly small quantities, corresponding to the size of the recess 22.

Having thus described the nature of the said invention and the best means I know of carrying the same into practical effect, I claim:—

1. In a dough grating machine, the combination of a hopper to receive the material, a base plate for said hopper having an opening, a catch plate below said base plate and spaced therefrom, rotary means for forcing the material through the opening in the base plate, and rotary means for removing the material from the spaces between said plates.

2. In a dough grating machine the combination of a hopper for receiving the material, rotary cutting and removing means in said hopper, said hopper having a recess into which some of the pieces are forced or caused to fall by said rotary means, a coarse meshed sieve below the hopper and rotary means for forcing said pieces through said sieve, a compartment to receive the dough pieces from the hopper, a fine meshed sieve in said compartment and rotary means for pressing the said pieces through the sieve.

3. In a dough grating machine the combination of a hopper for receiving the material, rotary cutting and removing means in said hopper, said hopper having a recess into which some of the pieces are forced by said rotary means, a plate, a coarse meshed sieve below said hopper, a rotating arm above said sieve for forcing the pieces of dough through said sieve, a compartment to receive the dough pieces from the hopper, a fine meshed sieve in said compartment and rotary means for pressing the said pieces through the sieve.

4. In a dough grating machine the combination of a hopper for receiving the material, rotary cutting and removing means in said hopper, said hopper having a recess into which some of the pieces are forced by said rotary means, a plate, a coarse meshed sieve below said hopper, a rotating arm above said sieve for forcing the pieces of dough through said sieve, a funnel to receive the pieces forced through said sieve, a compartment to receive the dough pieces from the said funnel, a fine meshed sieve in said compartment and rotary means for pressing the said pieces through the sieve.

5. In a dough grating machine, the combination of a hopper for receiving the pieces of dough, a delivery spout connected to the hopper at its lower end, a plurality of apertured plates in said spout, rotating cutting and removing arms in said spout for forcing the material through the apertures in said plate, a compartment to receive the dough pieces from the spout, a sieve in said compartment and rotary means for pressing the said pieces through the sieve.

6. In a dough grating machine, the combination of a hopper for receiving the pieces of dough, a plurality of apertured plates and a sieve in said hopper, rotating cutting and pressing arms for forcing the material past said plates and sieve, a funnel to receive the pieces from said hopper, a compartment for receiving said pieces from said funnel, a fine meshed sieve in said compartment and a rotary arm for pressing said pieces and forcing them through said last-mentioned sieve.

7. In a dough grating machine, the combination of a hopper for receiving the pieces of dough, a plurality of apertured plates and a sieve in said hopper, rotating cutting and pressing arms for forcing said material through the apertures in said plates and said sieve, a compartment to receive the pieces of dough from the hopper, a fine meshed sieve in said compartment, a vertical shaft and an arm secured to said shaft rotating in said compartment and adapted to press said pieces of dough into contact with said fine meshed sieve.

8. In a dough grating machine, the combination of a hopper for receiving the pieces of dough, a plurality of apertured plates and a sieve in said hopper, rotating cutting and pressing arms for forcing the material through said apertures and sieve, a compartment to receive the pieces of dough from the hopper, a fine meshed sieve in said compartment, a vertical shaft and an arm secured to said shaft rotating in said compartment, the leading edge of the lower side of said arm being beveled upwards, the arm being adapted to press said pieces of dough in contact with said fine meshed sieve.

9. In a dough grating machine, the combination of a hopper for receiving the pieces of dough, a plurality of apertured plates and a sieve in said hopper, rotating arms in said hopper for cutting, removing and finally pressing said pieces through said apertures and sieve, a funnel into which said pieces fall, a compartment below said funnel to receive said pieces, a sieve in said compartment, a horizontal shaft and means for driving said shaft, a vertical shaft and bevel gearing for driving said vertical shaft from said horizontal shaft, a pedestal bearing for said vertical shaft, an arm secured to said vertical shaft and rotating in close proximity to said sieve in the compartment, and means for raising and lowering said arm on said vertical shaft.

In testimony whereof I have signed my name to this specification.

PAUL WILHELM FUNCK.

Witnesses:
E. SCHLEICHER,
FR. KLAIBER.